(12) United States Patent
Schaeffer et al.

(10) Patent No.: US 10,290,089 B2
(45) Date of Patent: May 14, 2019

(54) CYANOBACTERIA ASSESSMENT NETWORK

(71) Applicant: The United States of America, as represented by the Administrator of the U.S. Environmental Protection, Washington, DC (US)

(72) Inventors: Blake Allen Schaeffer, Cary, NC (US); Robyn Nicole Conmy, Cincinnati, OH (US); Darryl Joel Keith, Wakefield, RI (US); Ross S. Lunetta, Cary, NC (US); Mark S. Murphy, Apex, NC (US); Torrin Hultgren, Seattle, WA (US)

(73) Assignee: THE UNITED STATES OF AMERICA, AS REPRESENTED BY THE ADMINISTRATOR OF THE U.S. ENVIRONMENTAL PROTECTION AGENCY, Washington, DC (US)

( * ) Notice: Subject to any disclaimer, the term of this patent is extended or adjusted under 35 U.S.C. 154(b) by 494 days.

(21) Appl. No.: 14/545,574

(22) Filed: May 22, 2015

(65) Prior Publication Data
US 2015/0339323 A1 Nov. 26, 2015

Related U.S. Application Data

(60) Provisional application No. 61/997,071, filed on May 22, 2014.

(51) Int. Cl.
*G06K 9/00* (2006.01)
*G06T 7/00* (2017.01)
*H04W 4/02* (2018.01)
*G06F 16/9537* (2019.01)
*H04L 29/08* (2006.01)

(52) U.S. Cl.
CPC ........ *G06T 7/0004* (2013.01); *G06F 16/9537* (2019.01); *H04W 4/02* (2013.01); *H04L 67/12* (2013.01); *Y02A 20/16* (2018.01)

(58) Field of Classification Search
CPC combination set(s) only.
See application file for complete search history.

(56) References Cited

U.S. PATENT DOCUMENTS

| | | | | |
|---|---|---|---|---|
| 2003/0018431 A1* | 1/2003 | Hanson | ............ | A01B 79/005 702/5 |
| 2006/0276967 A1* | 12/2006 | Warner | ............ | G08B 27/00 702/2 |
| 2012/0057782 A1* | 3/2012 | Bick | ............ | H04M 1/72522 382/165 |

* cited by examiner

*Primary Examiner* — Alex Kok S Liew
(74) *Attorney, Agent, or Firm* — Bacon & Thomas, PLLC (57) ABSTRACT

Systems and methods are used to determine the location and severity of harmful algal blooms or other water quality parameters. GPS location information is transmitted from a mobile device and recent Satellite image data and water quality parameters are provided to the mobile device. Data regarding other locations, historical water quality parameters and algorithm based predictive results are provided for the end user. This provides for near-real time information allowing users to make decisions regarding fishing, beach closures, municipal water intake, etc. so as to avoid toxic effects of a harmful algal bloom.

15 Claims, 10 Drawing Sheets

CYANOBACTERIA ASSESSMENT NETWORK

This application claims priority to Provisional Application 61/997,071, filed May 22, 2014, the contents thereof are incorporated by reference.

GOVERNMENT SUPPORT

The work resulting in this invention was supported by the Environmental Protection Agency. The Government of the United States may therefore be entitled to certain rights in the invention.

FIELD OF THE INVENTION

The present invention relates to methods and systems for rapid detection and identification of the location of harmful algae blooms and other water quality parameters.

BACKGROUND OF INVENTION

Certain aquatic species of microorganisms are toxic in high concentrations to animals and even some plants. Under certain natural or anthropogenically-enhanced conditions, typically seasonal and eutrophic conditions, these harmful species can multiply rapidly and occur in high concentrations resulting in a "bloom" of harmful phytoplankton. The concentration may be so high that visibility in water is limited to a few centimeters. Under such conditions, contact with or consumption of anything in contact with the bloom can be harmful to humans and biota.

Particularly notorious are blooms of many species of cyanobacteria in fresh, brackish and salt water. While many cyanobacterial blooms are nuisances, other species produce toxins that are harmful to people, animals and plants are exposed to or consume the bloom containing waters and to humans and animals that eat them. Toxic cyanobacteria blooms occur worldwide and are associated with human respiratory irritation, taste and odor of potable water, and human illness as a result of ingestion or skin exposure during recreational activities. Pets, domestic animals, and wildlife are also affected by exposure to cyanotoxins. Toxins produced by cyanobacteria can be found in water bodies used for drinking, aquaculture, crop irrigation, and recreation. Toxigenic cyanobacteria include *Microcystis aeruginosa*, *Nodularia spumigena* and various species of *Anabeena*, *Nostoc* and *Planktothrix*. These microorganisms produce a number of different neurotoxins and hepatotoxins and can end in rapid death or a neurodegenerative condition. In particular, BMAA producing species may cause a condition resembling ALS/Parkinsons/dementia complex.

Blooms of non-cyanobacteria include *Alexandrium fundyense* that frequently occurs in the Gulf of Maine. This dinoflagellate produces saxitoxin, the neurotoxin responsible for paralytic shellfish poisoning. Blooms of *Pseudonitzschia*, a diatom, occur in the California coastal waters and are known to produce domonic acid, the neurotoxin responsible for amnesic shellfish poisoning. Blooms of by *Karenia brevis*, another dinoflagellate, produce the "Florida red tide" that occurs in the Gulf of Mexico. This organism produces brevetoxin, the neurotoxin responsible for neurotoxic shellfish poisoning. Some harmful blooms are not even composed of photosynthetic organisms such as *Pfisteria* and *Myrionecta rubra* (previously known as *Mesodinium rubrum*). Relatively less harmful large algae have caused blooms, such as those of sea lettuce in Qingdao, China, in 2013.

Harmful algal blooms have increased in frequency and size in recent decades and the health, environmental and economic impact of these blooms is the topic of much study. The United Nations through UNESCO has even established the Global Ecology and Oceanography of Harmful Algal Blooms (GEOHAB) for this purpose.

In the United States, the direct economic cost of freshwater degraded by harmful algal blooms is estimated at $64 million annually. Additionally, the costs of losses in salt water and estuary fishing, shellfish harvest, the medical costs due to sickness and death resulting from the harmful algal blooms and tourism losses from closed beaches are substantial but difficult to estimate. On Aug. 12, 2014 the water supply for over 400,000 people in and around Toledo, Ohio was stopped because of a cyanobacter bloom near the water intake. Not having access to water may cost little but the inconvenience is great.

Harmful algal blooms rapidly expand, contract and move due to many causes. Attempts have been made to monitor the presence of harmful blooms. NOAA had developed a "Harmful Algal Bloom Forecast" is based on collecting individual observation in the "beach conditions report" and analyzing data to develop a forecast. This system is based on human reports of observed beach conditions and testing of water samples which are only determined after the algal bloom has reached the beach.

While satellite imaging is an established field, historically, few decisions regarding water quality rely on satellite images. The rapidly changing nature of water quality and relatively slow dissemination and analysis of satellite information has prevented significant use other than retrospective studies.

There are two main operating software packages that are considered the standard in water quality satellite observations, also referred to as ocean color. The first software package is SeaDAS available for free from NASA. The second software package is BEAM available from the European Space Agency for free. Both software packages are desktop based and require significant scientific expertise in the field of ocean color remote sensing. These software packages provide essential processing, display, analysis, and quality control functions for scientific research. The software also requires large hard drive space and memory to handle the raw satellite images and processing capabilities. In addition computer code language expertise is required to manipulate the satellite data; languages typically include Interactive Data Language, Python or JAVA. These software packages produce derived water quality products such as chlorophyll concentration. However, the software to date is primarily geared toward the scientific research community and is not intuitive for decision makers and those who make day-to-day decisions.

Ocean Color satellites capture temporal and spatial imagery of coastal areas, estuarine and inland waters. These images can reveal concentrations of environmental parameters. Today, this data is accessible to scientists, but the amount of data is large and to process the data requires considerable computer processing ability and time. This relevant information is not processed and delivered to official users in a manner that demonstrates its practical value to daily life.

In order to provide meaningful information about nuisance and harmful algal blooms and other water quality parameters for decision makers in a timely manner and to overcome the previous problems, the following invention was made.

SUMMARY OF THE INVENTION

The invention is a mobile application that takes a location dependant subset of satellite imagery of marine and freshwater systems that measures water quality parameters, such as turbidity, surface temperature, light attenuation, chlorophyll concentration and cyanobacteria cell counts. This information allows the user of a mobile device with suitable software make decisions based on water quality parameters at various locations.

The present invention provides for a method for viewing water quality parameters in natural water bodies in a rapid manner.

The present invention further provides for location and quantity information on water quality parameters to people at or near a location in order to make decisions on their course of action.

The present invention also seeks to project and predict the future location and density of harmful and nuisance algae blooms and to inform those at or near the body of water so that appropriate plans can be made.

The present invention achieves these objectives by providing a subset of satellite imaging data to a mobile device in an easy to understand manner with intuitive data manipulation to provide current information regarding a water quality parameter. The basic steps in the present invention begin with downloading historical and current satellite or aerial imaging data continually to a database. Separately, a mobile device with suitable software then sends location information to the database that in turn extracts a subset of information regarding the requested location and then transmits that information to the mobile device for further processing, analysis and visualization.

People will have the opportunity to be at a sampling location, pull up the satellite imagery on their mobile device and view a map of their surroundings in terms of water quality parameters. The application will also allow users to point at a particular location of interest and view the historical archive of all available water quality parameters at that particular location for viewing of the historical record. The user will have the ability to select a location and see both near-real time data and historic water quality parameters.

DETAILED DESCRIPTION OF THE INVENTION

Definitions for specific terms.

Water quality parameter includes any property or component in a body of water that is derived from radiometrically or spectrophotometricly detectable or measurable wavelengths or combinations of wavelengths. The measurement may be qualitative, quantitative and may be of a proxy or indicator of a water quality parameter. Typical examples are chlorophyll-a concentration, turbidity, surface water temperature, light attenuation, organic matter, type of microorganism or cell present and its concentration, type of chemical present and its concentration, salinity and the presence of, type of and amount of animal and plant life.

Mobile device refers to an electronic device in wireless communication with a provider of data and having a memory for received data and processor for executing non-transitory instructions in the mobile device.

Water bodies or bodies of water refers to naturally occurring surface water such as oceans, lakes, estuaries, rivers and man-made bodies of water such as canals, reservoirs, and the like. The water may be fresh, brackish or salt water.

Harmful algal blooms refers to concentrations of organisms that are toxic to plants, animals or humans when in contact with water, associated air or aerosols containing the organism or toxin or when eating plants or animals in contact with the harmful algal bloom or toxin. While typically a type of algae or cyanobacteria, other photosynthetic plankton and even non-photosynthetic organisms can be harmful to other life in the body of water are considered within the meaning of a harmful algal bloom. Nuisance algal blooms refer to concentrations of organisms that are non-toxic but may cause visual, odor, or other undesirable effects to humans and the surrounding environment. These blooms, while not necessarily toxic, may also be considered harmful algal blooms as they block sunlight and present other problems.

A first preferred embodiment of the present invention is the method for building and using a database of satellite image data and its analysis for bodies of water. The satellite includes manned or unmanned spacecraft in moving orbit, geosynchronous orbit or mounted on another object. Satellite may be natural, such as the moon, or man-made. Other non-satellites may be used for providing similar image data such as aerial imaging from an airplane, drone, balloon or even from an elevated natural or man-made structure that can support the optics and/or radiometry. The imaging system may be located directly above the water body or at an angle capable of looking down on the water body.

Satellite image data from multiple satellites are downloaded continually and the information is as current as possible. Historical data containing similar images taken many times in the past are also included. Aerial image data may also be included in this database to the extent it is available.

The satellite data may be provided from general purpose imaging satellites such as HICO on the International Space Station, MODIS on the AQUA and TERRA satellites, MERIS on the Envisat satellite, Sentinel-2, Sentinel-3, Suomi NPP, PACE Sentinel-3, Landsat, or it may be from a specialized satellite at least partially dedicated to this function.

Satellite image data may be in the form of a single wavelength, combinations of certain wavelengths or wavebands or many wavelengths/wavebands, up to all available wavelengths/wavebands. Different wavelengths or combinations can be used to derive different water quality parameters. The satellite image data may be modified by the image data provider or raw data may be uploaded to the database. Image data modified by other entities may also be uploaded to the database. A number of models and algorithms for making sense of satellite data are publicly available.

A server containing a database of the present invention is part of a generally a stationary system having considerably more memory and/or computing ability than a mobile device. The database contains multiple images from satellite data from different times. Since satellites pass over and image the same general portion of the world frequently, the amount of historical data is considerable. Within each satellite image, coordinate data (e.g. GPS) is incorporated as well as designated names for various bodies of water and regions within each body of water.

The system controlling and containing the database also has the capability to extract image data from a desired region based on coordinates provided. This desired region may be of any size from the smallest resolution of satellite data to thousands of square kilometers.

The system containing the database is in wireless or wired communication to the end user's electronic device, typically a mobile device or fixed computer. Location data is received by the system and image data corresponding to a desired region surrounding the location is extracted from the database and sent to the mobile device. The system may process the extracted image data before being sent to the mobile device if desired; such as, sending only certain wavelengths that correspond to certain water quality parameters or a proxy for the water quality parameter. For certain types of analysis, which are not conveniently performed on a mobile device, the system may apply certain algorithms to provide numerical values.

When historical image data is requested, the system may optionally adjust the historical data for expected seasonal variations in water quality parameters when appropriate. Other adjustments may be noted or provided along with historical image data such as differences in weather, sunlight, temperature, etc. that may assist in interpreting the historical image data in context.

A second preferred embodiment of the present invention is the method and apparatus for displaying results for the end user on a mobile device. The mobile device can provide derived geo-referenced water quality parameters from satellites to the end user based on extracted image data on the server. The mobile device may be of any platform. Presently the Android platform is the most popular open source platform that is available on multiple devices. Other platforms include, iOS, Symbian, RIM, Bada, Windows Mobile and others may be used in the same manner with different software code corresponding to producing the same display and results.

The mobile device may be equipped with a global position system (GPS) indicator and be used alone or a separate device outputting GPS coordinates or a map having coordinates may be used in conjunction with the mobile device. The mobile device also contains a processor and memory sufficient to run software loaded into in accordance with the present invention. The mobile device also has the apparatus to communicate wirelessly with the server. Many conventional smart phones and tablets sold today contain all of the necessary hardware to which the software may be loaded as an "app" to provide the instructions to carry out the functions of the present invention.

In operating the mobile device of the present invention, it first communicates with the server and a location of interest is transmitted to the server. The location of interest may be chosen from display menus to click on, touch screen or otherwise select, to select the water body, regions within the water body or by direct entry of location degree coordinates. When the user is interested in his/her present location, a GPS may automatically or semi-automatically send the coordinates designating the location of interest.

The server then extracts the most recent satellite image data for the region of interest (a desired region) closest to the location of interest and transmits it to the mobile device. The amount of data extracted is sufficiently small; therefore the mobile device is capable of handling the storage and analysis of the image data. If historical image data is desired, the user may specify the historical time(s) desired and the server will send image data for those times if available for those dates. This is similar to obtaining other historical data, such as stock ticker data. The results may be displayed on different screens or overlaid on the same screen.

Different satellites and even different sensors on the same satellite result in multiple unique images. Specific images are better suited for measuring different water quality parameters. The present invention provides for multiple satellite images data to be transmitted and viewed for the region of interest. The different images or numerical, color or graphical data may be overlaid on the same screen or shown on separate screens.

Resultant data covering multiple screens are conveniently flipped back and forth to allow easy review.

Water quality parameters of interest may be pre selected or entered and data form the image data is extracted and presented as a new image of the region of interest corresponding to the water quality parameter(s) requested. Alternatively, the water quality parameter(s) may be displayed in numerical or false color format for the specific location coordinates (or as near as the data available with the resolution ability of the image data) if requested by the user.

In certain circumstances the user may desire to know the water quality parameters for a specific location. Typically this would be in the current location or specific natural or man-made features such as a water intake or discharge point, or designated beaches. In these situations an image as well as tabulated data may be needed for a particular location.

The present location feature provides for input of one or more specific locations based on GPS or inputted location coordinates. Also, a map display may be shown and specific locations designated by clicking or touch screen designating a drop pin. Such methods are conventional to various mapping programs. On one or more maps or images, one or multiple pins are designated and the results for each site are displayed.

Water quality parameters have varying standards of acceptability depending on how and who set the standards. The World Health Organization, various countries, different states and localities each have set different standards for acceptable amounts of cyanobacteria in the water. Some countries, states and localities do not have any standards at all for the amount of cyanobacteria in swimable or drinkable water. Furthermore different standards may be used for different purposes such as swimming in vs. drinking vs. various animals and plants for consumption. Note that different species may have different thresholds for tolerance. For example, certain shell fish are filter feeders and may not be edible whereas certain fish may be. The user may select from a pull-down list of applicable standards and their corresponding use or purpose. Alternatively, end users may wish to apply their own thresholds for cyanobacteria in water.

Likewise, different nuisance and harmful algal bloom species or a proxy for them will have different thresholds and these thresholds (or ranges) will need to be adjusted accordingly.

For example, low concentrations of toxic phytoplankton may be harmful to only certain biota that have low tolerances. Low concentrations may render certain animals inedible to humans or animals such as aquaculture, fish, shellfish, invertebrates (lobster, crab, squid, octopus . . . ) mammals (seals, porpoises, whales . . . ), amphibians and reptiles (sea turtles, frogs, alligator/crocodiles, snakes . . . ), water foul and birds migrating over the water in question. Also toxic effects on other plankton, corals, seaweed and higher order plants may be taken into consideration.

High concentrations may be unacceptably toxic to humans, livestock and companion animals to drink, swim in, or even have contact with water specific natural or man-made features such as a water intake or discharge point, or designated beaches.

The present invention allows the end user to set multiple thresholds for each water quality parameter viewed.

A third preferred embodiment of the present invention is a projection and prediction of the future water quality parameters in the region of interest. To do this, historical image data, and recent data, is analyzed and the predictive result is displayed for each water quality parameter. The algorithm(s) analyzing the data may be part of the software loaded on the mobile device or they may be located with the server and run before transmitting the predictive results to the mobile device.

Predictions may be based on extrapolations of current trends. Outside factors such as time, light, weather, water currents, etc. may also be incorporated into the predictive model. Also, historical data about the same or similar water body and a similar nuisance or harmful algal bloom may be incorporated into the model as well.

Different water quality parameters will have different levels of confidence in any predictive model. The degree of confidence may be displayed along with the predicted future water quality parameters.

The resulting predictive model will show development of, dissipation of and movement of a harmful algal bloom. Under ideal circumstances predictions may be somewhat accurate for the next several days. Under other situations meaningful prediction can be limited, such as if a hurricane is expected to pass through the region of interest.

The present invention is particularly designed to cover areas at or near where people recreate, fish, harvest seafood and sources of potable water.

By continually updating the server with satellite imaging data, near-real time conditions may be provided to users in a timely manner when one can act proactively. Near real time is typically 1 to a few days depending on how often a particular satellite passes over and images the body of water at the desired region or region of interest.

Unlike previous software packages, the present invention does not require specific scientific expertise to derive water quality parameters from scientific measures of satellite or aircraft remote sensing reflectance. The present invention provides intuitive ability through a graphical user interface (GUI) to scan water bodies for changes in water quality parameters without the requirement of having technical expertise in computer programming or computer languages. This allows users to follow their particular water bodies of interest without having to filter through numerous images of water bodies not associated within their region of interest. When a water quality parameter is above a desired threshold an alert may be provided to the user. The present invention may always be running with passive continual updates from the server for locations of interest. The user may set preferences for displaying and analyzing data on their mobile device.

Non-technical or non-scientific users are able to interpret the satellite images much as one interprets a weather map. For example one can to visualize storms moving through the area and see the amount of rain from a weather map without ever understanding how such images are generated.

Likewise the present invention can use a color scale for different water quality parameters. For example, lighter shades (e.g. a grayscale or blue shades) may indicate lower amounts. Alternatively, false color displays may be useful.

Not all algal blooms are the same. Some can be undesirable, neutral or even beneficial depending on your purposes or perspective. Certain species or mixtures of certain species cause harmful algal blooms. The present invention can differentiate between certain types of algae and can provide additional information of value.

For example, users may need to make tradeoffs between target concerns such as water clarity vs. with toxicity. Certain ecosystems and water uses may require different levels of concern for such factors.

While the present invention is generally used with a mobile device, one could use a fixed device, such as a desktop computer, in the same manner. In such a situation, the communication may be by wires. Administrators, executives and other decision makers, such as public health departments, capable of ordering beaches, fisheries and aquaculture to close, are sometimes far from the actual location of the harmful algae bloom. In such a situation, the end user may be in an office building with access to a fixed device. Also, either a mobile device or a fixed device may be used as a dumb screen without any specialized software and be connected to a web portal. As such, all of the processing may be done outside of the mobile device or fixed device or by using non-permanent software instructions. Such a system, with a contrary definition of "mobile", is also within the scope of the present invention.

Additionally, as new algorithms to derive different water quality parameters and/or predict their future are developed they could also be included into the application. These can be provided as regular updates or automatic updates whenever the mobile device user next contacts the server.

The present invention's imaging and analysis of water quality parameters may be combined with actual on site water sampling and/or testing. For example, a person on a boat may directly measure water temperature, pH, nutrient concentrations, chlorophyll concentrations, microbial testing and a long list of water quality parameters, including those not detectable by satellite image data. Since the mobile device's GPS provides the location of the water sample taken, the results can be directly interpreted with the image data analysis. This sample testing may confirm the image data analysis or add to it and the combined data may be even more helpful.

While the focus of the present application is on detection and analysis of nuisance and harmful algae blooms, the same system may be used for detection and analysis of other materials in a body of water. For example, a chemical spill or petroleum leaking from an offshore well may be detected, monitored and analyzed using the present invention. In such a situation, the concentration of the material may be determined and acceptable concentrations be set as thresholds. Other suitable uses include agricultural run-off, manure or raw sewage discharge, mining wastewater, construction site silt, and other residential or commercial release of material into water bodies.

Natural and semi-natural phenomenon may also be imaged and analyzed using the present invention. For example, determination of a "dead zone" of hypoxic conditions or locating large schools of animals is of value to fishermen.

Example 1: The Database, Server and Administration Website

Satellite data downloaded from multiple public sources of data were stored on a server as a database of historical and current data. This information is accessible and controlled by an administrator who has the ability to change the data and access to it.

The administration website starts with a Main Log-in page allows administrator to enter the backside of the mobile application for general maintenance. Access is controlled and not generally available to the public. The administrative portion is password protected and if needed, the administrator can select "Forgot password" to receive a temporary password reset. This side has the Manage Prediction Data site that allows the administrator to view data files and model prediction results and is the main splash page for the administration website. From this page, the administrator accesses a Manage Accounts page that allows the administrator to delete or edit other administrative accounts. These primary accounts can create new user administrator accounts. It also has an Edit function that allows administrative users to modify their password and email addresses. The administrator, through a send notification page allows the administrator to send out push notifications to all users, such as version updates or general notifications.

The database on the server is continually expanded via an administrator's +Add files ability that uploads satellite image files from a local directory. Additional data is uploaded using The Start upload feature, which allows the administrator to being the file upload process. The administrator using the +Add file from URL allows the administrator to connect to FTP or HTTP websites to upload files. This allows new satellite data to be added to the database.

For prediction purposes an algorithm is applied to selected data to provide a predictive model for the changing harmful algal bloom. The View Prediction Result allows the administrator to view previous model prediction results from previous dates. The View Execution Status allows viewing of recent requests for algorithm predictions. This may involve an Execute Prediction Algorithm allowing users to set the number of days the prediction should run into the future.

Additional functions from the Aggregate Data page allows the administrator to view scientific ecological data that is summarized at different levels, such as at the state level or over an entire year. Also, the Configure Execution Parameters allows the user to select the number of images and time interval between automatic executions.

Example 2: The Mobile Device Application

A mobile device was equipped with a visual display touch screen, a GPS and has been loaded with the software to run as follows. The mobile device is in a wireless connection with the web site run by the administrator in EXAMPLE 1.

After logging on, the first page provides for a selection for state or other general location of interest. After selecting a state the user is able to select a particular water body of interest. The water body of interest is then displayed with the most recent satellite image and the user has the option to select from different water quality parameters that the user wishes to have displayed. This allows the user to visualize different characteristics of the satellite image. The user also has the option of selecting specific date ranges of available images for each water body. The application will then display the selected date.

Figure 1:
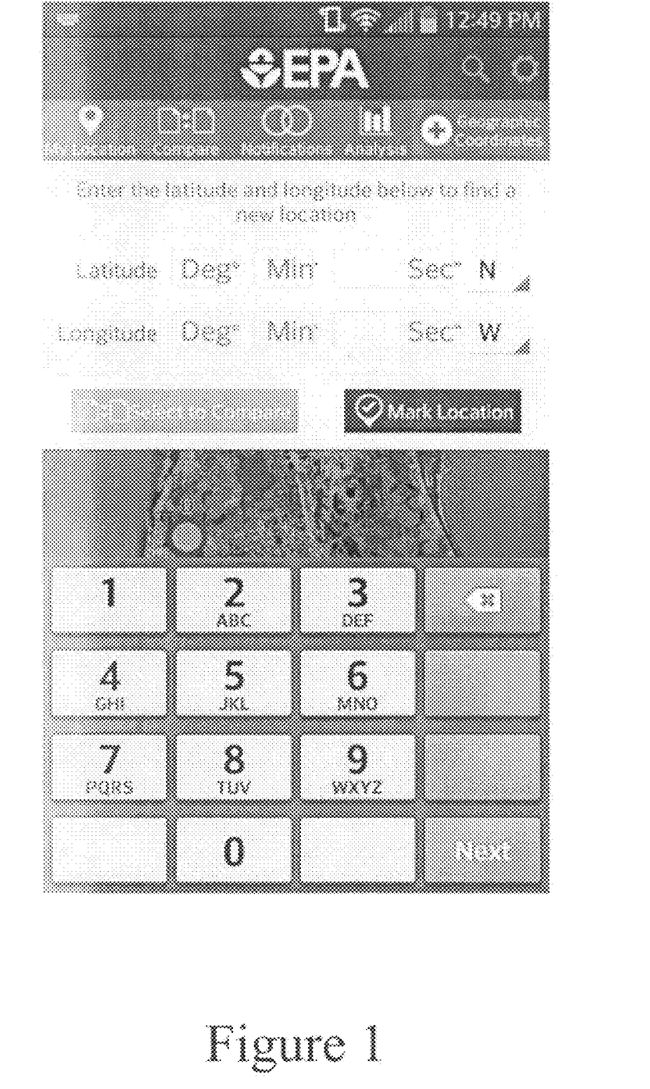
FIG. 1 is a display of a page function to search and set locations by geographic coordinates if not the current GPS location of the mobile device.

Specific locations (or as close as is available) may then be selected. The user can select a location by either touching/clicking on the map, using the device GPS associated with the mobile device to automatically designate the present location or by manually entering coordinates as shown in FIG. 1.

After selecting a specific location the user is presented with a choice of a time or a time-series graph for a selected particular water quality parameter for all available historical data or a designated time range. This allows one to visualize changes over time for that parameter.

Figure 2:
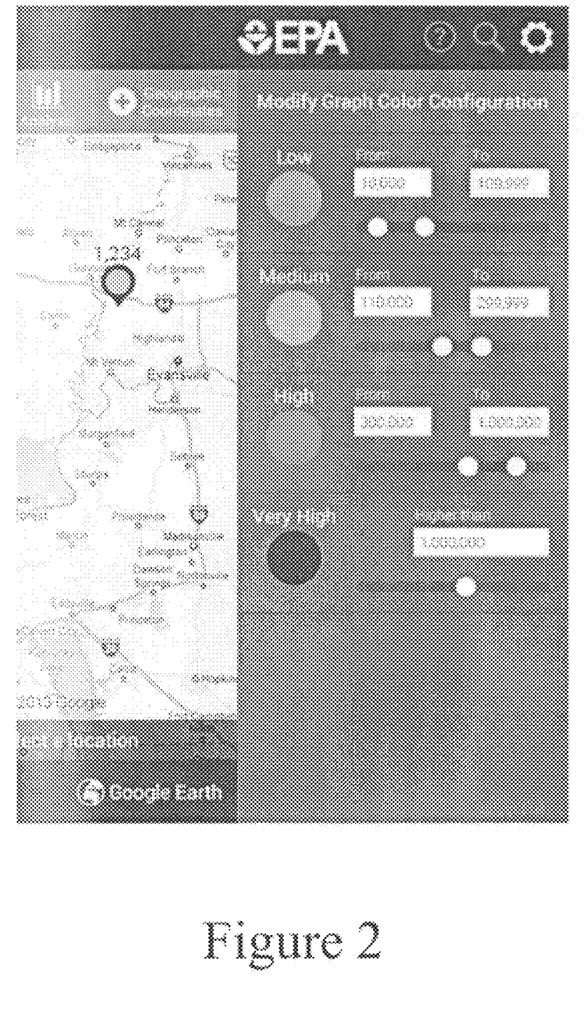
FIG. 2 is a display of a page function to change threshold settings of a water quality parameter.

Users also have the option of entering a water quality assessment of their own. Reference values of different acceptable ranges and standards may be adjusted for each water quality parameter as shown in FIG. 2.

Figure 3:
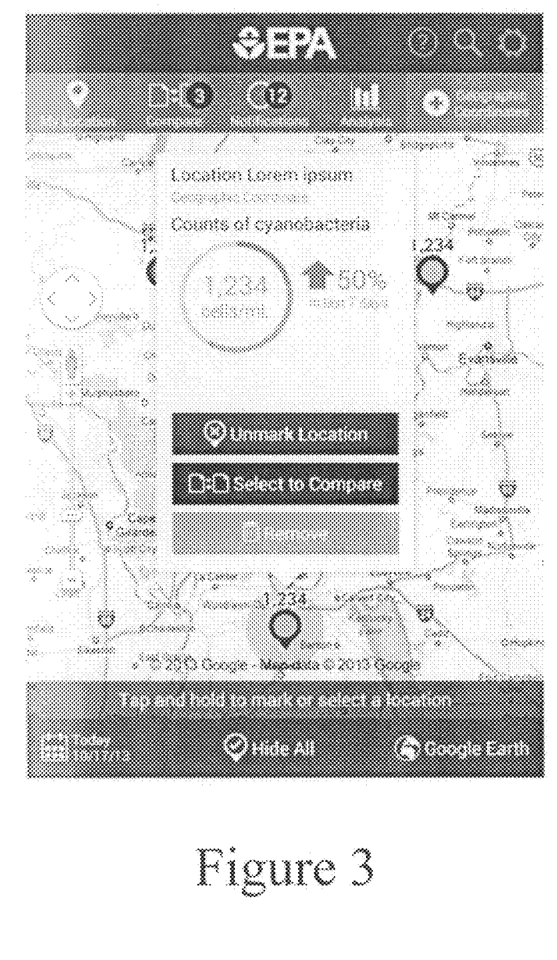
FIG. 3 is display page to determine water quality at a site.

The user can select the latitude and longitude using either the device GPS or with manual entry or by designating a location on the screen. The user has two options, either a qualitative or quantitative response. The qualitative response options include extremely poor, poor, fair, good, or excellent. The quantitative response options provide numerical data, and may be altered to provide desired measures such as entering the secchi depth or visibility measure in either feet or meters. Both measures may be displayed simultaneously. The results may be shown for a particular location and/or have a display box having one or both of the response options such is shown in FIG. 3. Alternatively, a color shading (customizable) may be superimposed on the image to provide a relative measurement for the surrounding area.

Multiple locations may be selected and the water quality parameters for each are evaluated and displayed as separate screens, which the user can flip back and forth or multiple screens may be displayed side-by-side. If desired additional or fewer locations may be added or deleted.

Figure 5:
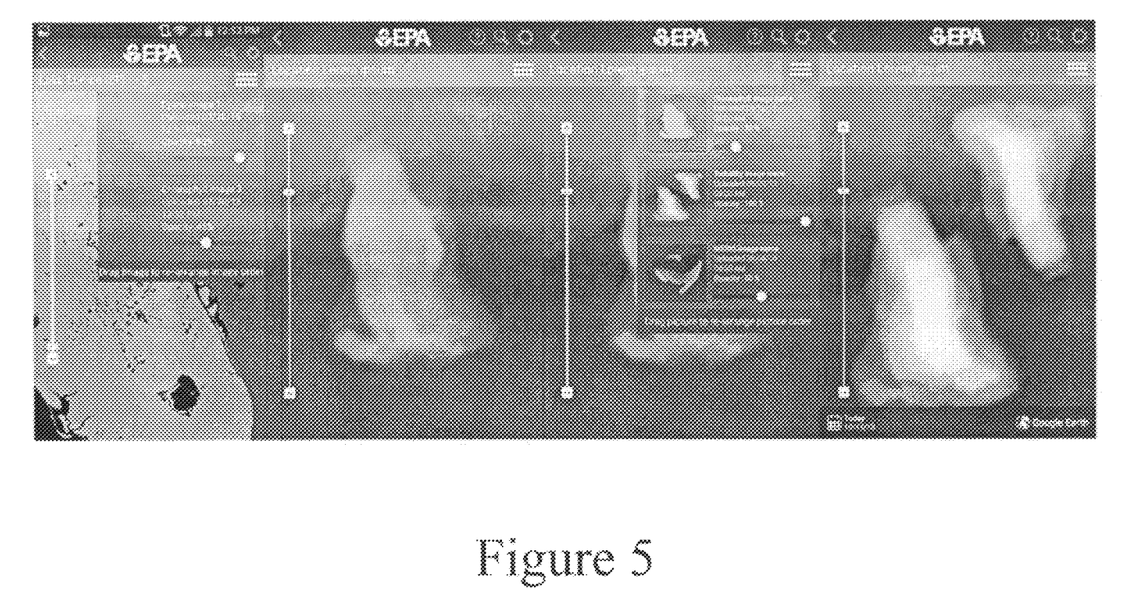
FIG. 5 are display pages to overlay different water quality product images or different temporal images by selecting Overlay on map on the bottom left screen (left). The first image is displayed (center-left). Selecting the three bars on the top right of the screen allows the user to select opacity for each overlay image (center-right).

Multiple parameters for the same or different locations may be displayed on the same screen, overlaid on each other or on an additional screen that may be flipped back and forth as shown in FIG. 5

Figure 4:
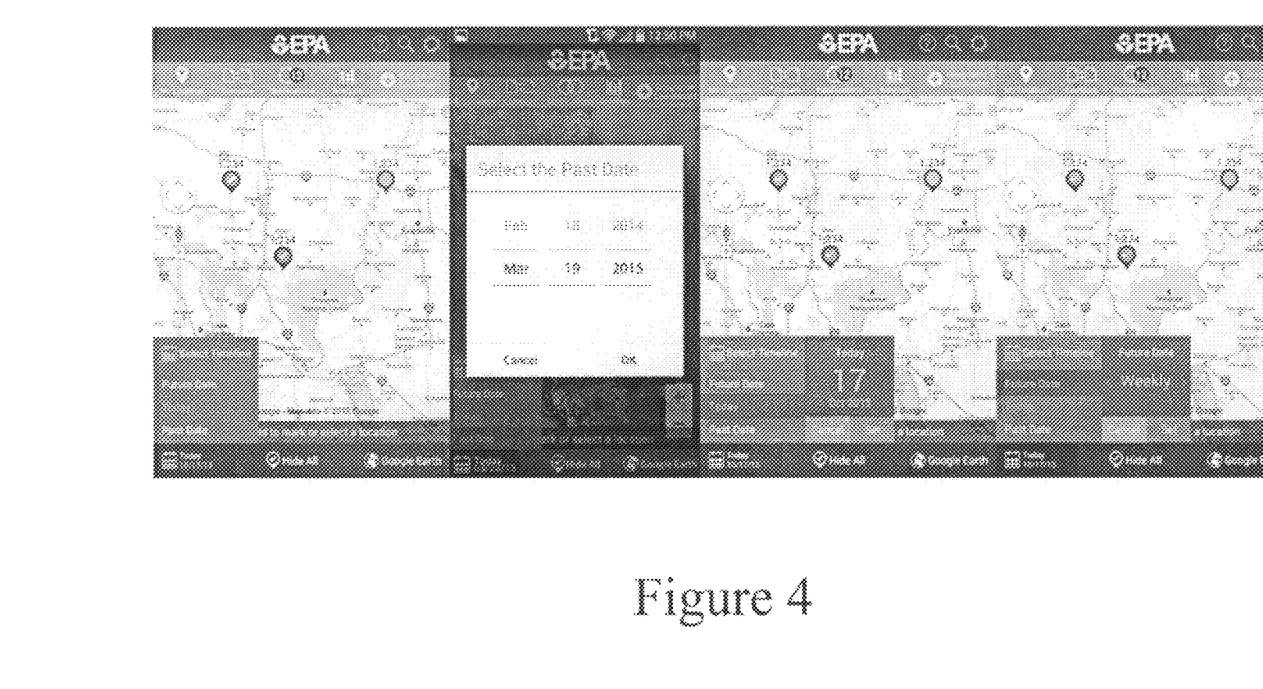
FIG. 4 are display pages for date selection for data viewing for the current day (left), a section of choosing historical data (center-left), previous/future date data/prediction (center-right), and temporal composite (right).

Also, data from multiple times may be chosen and displayed adjacent or on another screen for comparison purposes. The times may be either current or historical as shown in FIG. 4.

Location information is presented when the user selects the drop pin mark under the Overview tab. Specific notes on the location can be logged on the Notes link. Under the Imagery tab users can select either the satellite sensor or water quality parameter. The user is then presented with available data images from the specified sensor and parameter. Users can select desired images from this screen for download to the mobile device.

The user has an option to overlay different water quality product images or different temporal images by selecting Overlay on map on the bottom left screen as shown in FIG. 5 (left screen). The first image is displayed (center-left screen). Selecting the three bars on the top right of the screen allows the user to select opacity for each overlay image (center-right screen). The user can also drag the images up and down to re-arrange picture order for viewing. For example, selecting the turbidity image to display on top results in viewing only the turbidity image (right screen).

Example 3: Algal Bloom Prediction

Figure 6:
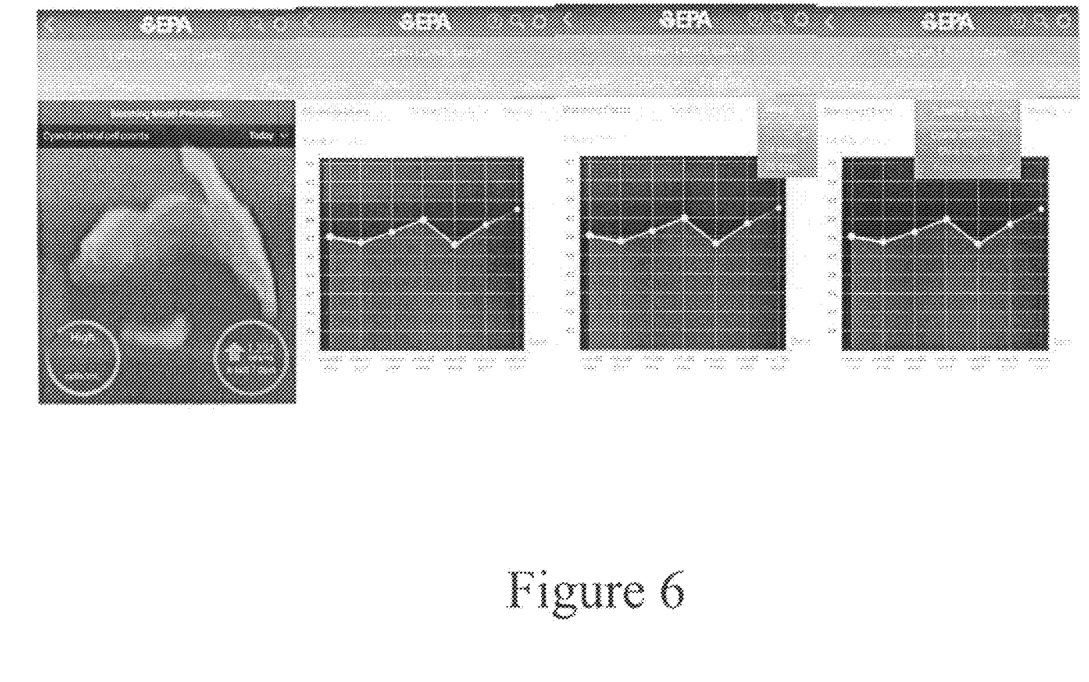
FIG. 6 is a display page from the prediction tab showing a modeled prediction results for future dates (left). The user can also select the Chart tab to see a temporal series of data (center-left). Users can select the time interval from weekly, bi-weekly, and 28 days (center-right). Users can also change the water quality product by selecting the desired product (right).

The mobile device application used in Example 2 not only describes current conditions but when combined with historical data and extrapolating the results with a predicting algorithm it can predict the future course of the algal bloom. As shown in FIG. 6, selecting the Prediction tab allows the user to view modeled prediction results for future dates (left screen). The user can also select the Chart tab to see a temporal series of data (center-left screen). Users can select the time interval from weekly, bi-weekly, and 28 days (center-right screen). Users can also change the water quality product by selecting the desired product (right screen).

Faced with algal blooms and open water in various locations, the user can use the present invention to compare and choose where they wish to be accordingly. The user can select My Locations tab to see selected location data changes. Colors are based on the user preference thresholds (left screen). The user can search for specific locations within their list (center-left screen). Selecting locations and selecting the Compare tab allows the user to compare data from individual locations (right screen). Selecting the Compare Locations button allows the user to graphically compare changes in data. This may be done with present data, historical data or predictive future data.

Figure 7:
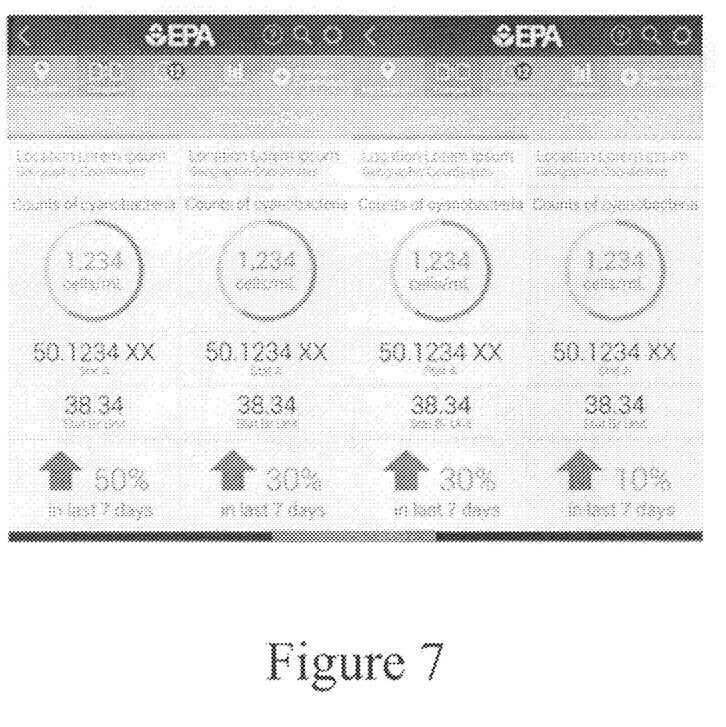
FIG. 7 is a display page for Compare Locations with the displayed available statistics for each site, side-by-side.
Figure 8:
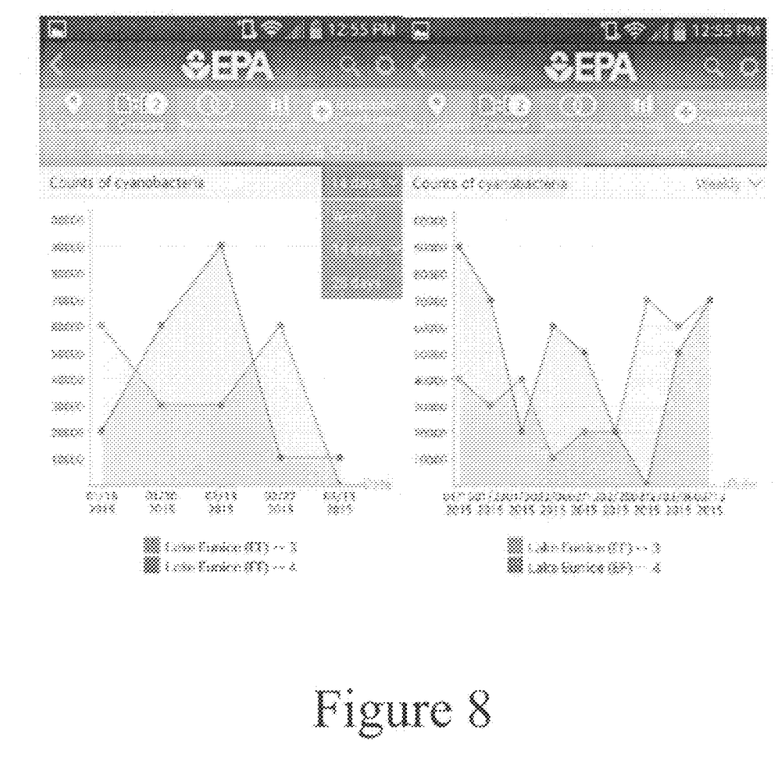
FIG. 8 is a display page for Selecting the Blooming Chart tab that allows users to graphically display the data and for selecting different time periods.

After selecting Compare Locations, as shown in FIG. 7, the user displays available statistics for each site, side-by-side (left screen). If more than two locations are selected the user can scroll from left to right using the scroll bar at the bottom of the screen (center-left screen). By selecting the Blooming Chart tab, as shown in FIG. 8, the user can graphically display the data in chart format. The user can also change the time step interval by selecting either weekly, bi-weekly, or 4 weeks. This further helps the user to extrapolate the water quality parameters from multiple locations to provide better indications bloom severity and location.

Selecting the Notifications tab allows the user to see notifications for selected locations that meet certain preselected criteria. The user can select each notification individually for a larger view and detailed analysis.

Figure 9:
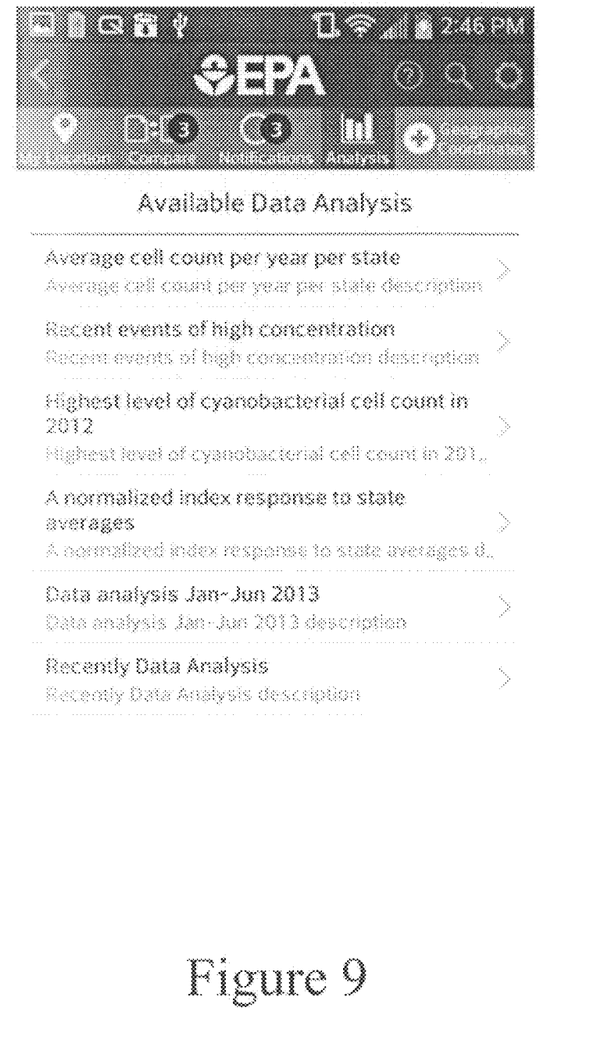
FIG. 9 is a page display for Selecting the Analysis tab allowing one to view aggregate data statistical options. Selecting a specific statistical option allows the user to view the specified data results.
Figure 10:
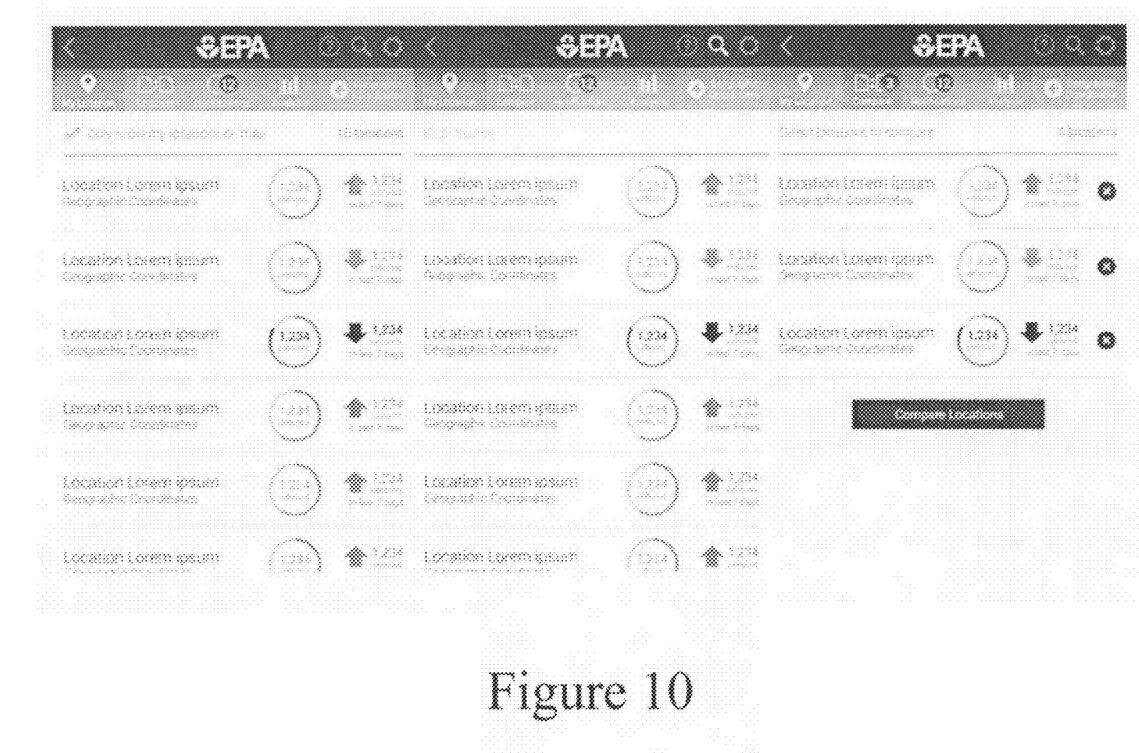
FIG. 10 is a page display of the tabulated compare locations feature.

Selecting the Analysis tab allows user to view aggregate data statistical options as shown in FIG. 9. Selecting a specific statistical option allows the user to view the specified data results.

It will be understood that various modifications may be made to the embodiments disclosed herein. Therefore, the above description should not be construed as limiting, but merely as exemplifications of preferred embodiments. Those skilled in the art will envision other modifications within the scope and spirit of the claims appended hereto.

All patents and references cited herein are explicitly incorporated by reference in their entirety.

We claim:

1. A method for displaying water quality parameters in a desired region within a body of water on a mobile device comprising:
   connecting the mobile device to a server containing a database of continuously updated aerial or satellite image data of the desired region within the body of water, so that image data may be transmitted,
   transmitting location coordinates of the desired region from the mobile device to the server containing the database,
   receiving the aerial or satellite image data regarding the water quality parameters at or near the location coordinates from the database contained on the server to the mobile device,
   determining the water quality parameters from the received aerial or satellite image data, and
   displaying water quality parameters on the mobile device.

2. The method of claim 1 wherein the transmitting and receiving is performed wirelessly.

3. The method of claim 1 further comprising setting an acceptable threshold for a water quality parameter and displaying whether the water quality parameter is within the acceptable threshold.

4. The method of claim 1 wherein multiple location coordinates of the desired region or multiple desired regions are transmitted, image data regarding each are received and water quality parameter for each location or desired region is displayed.

5. The method of claim 1 wherein near real time image data for the desired region is received and displayed.

6. The method of claim 5 wherein historical image data for the desired region is received and displayed.

7. The method of claim 1 further comprising analyzing the image data to predict future water quality parameters for the location or desired region.

8. The method of claim 1 wherein the location coordinates are a present location of the mobile device as determined by GPS.

9. A mobile device containing software instructions for displaying water quality parameters in a desired region within a body of water comprising; a mobile device with a data connection to a server containing a database of continuously updated aerial or satellite image data from the body of water, a GPS location component for sensing and transmitting location coordinates of the mobile device's location or other designated location coordinates, and capable of transmitting them to a server, a screen displaying water quality parameters on the mobile device, and a memory device containing instructions, wherein the instructions are capable of directing transmission of location information and manipulating the aerial or satellite image data received from the server to display numerical, graphical or image data of water quality parameters derived from the aerial or satellite image data for the transmitted location information.

10. The mobile device of claim 9 wherein the data connection is wireless.

11. The mobile device of claim 9 wherein the instructions are capable of setting acceptable thresholds for water quality parameters.

12. The mobile device of claim 9 wherein the instructions are capable of directing transmission of multiple locations and displaying water quality parameters for the multiple locations.

13. The mobile device of claim 9 wherein the instructions are capable of displaying water quality parameters for the desired region for different times in the past.

14. The mobile device of claim 9 wherein the instructions are capable of analyzing the image data and displaying a prediction of future water quality parameters for the desired region.

15. The method of claim 1, wherein at least one of the water quality parameters is the amount of cyanobacteria in the desired region within the body of water.

* * * * *